United States Patent
Causley

(10) Patent No.: US 10,207,752 B2
(45) Date of Patent: Feb. 19, 2019

(54) LOAD-RESISTANT SPOILER MECHANISM FOR VEHICLE

(71) Applicant: Multimatic, Inc., Markham (CA)

(72) Inventor: Joel David Causley, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 15/524,981

(22) PCT Filed: Apr. 5, 2016

(86) PCT No.: PCT/US2016/026011
§ 371 (c)(1),
(2) Date: May 5, 2017

(87) PCT Pub. No.: WO2017/052691
PCT Pub. Date: Mar. 30, 2017

(65) Prior Publication Data
US 2018/0001944 A1    Jan. 4, 2018

Related U.S. Application Data

(60) Provisional application No. 62/222,444, filed on Sep. 23, 2015.

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
USPC ...................................................... 296/180.5
See application file for complete search history.

(56) References Cited

U.S. PATENT DOCUMENTS

| | | | |
|---|---|---|---|
| 4,688,840 A | 8/1987 | Kretschmer | |
| 4,886,312 A | 12/1989 | Asoh | |
| 6,030,028 A | 2/2000 | Radmanic et al. | |
| 6,637,806 B2 | 10/2003 | Kazama | |
| 6,886,883 B2 | 5/2005 | Jacquemard et al. | |

(Continued)

FOREIGN PATENT DOCUMENTS

| | | |
|---|---|---|
| DE | 4305090 | 8/1994 |
| DE | 102008029884 A1 | 1/2010 |

OTHER PUBLICATIONS

International Search Report & Written Opinion for PCT/US2016/026011 dated Jul. 14, 2016.

(Continued)

Primary Examiner — Joseph D. Pape
(74) Attorney, Agent, or Firm — Carlson, Gaskey & Olds, P.C.

(57) ABSTRACT

A spoiler mechanism (13) for a vehicle (10) includes a spoiler (16) that has a stowed position and first and second deployed positions. An actuator (22) is configured to move the spoiler (16) though the stowed and first and second deployed positions in response to a command. A multi-link assembly (20) is interconnected by pivot points. The multi-link assembly (20) is operatively connected to the spoiler (16). In the first deployed position at least three pivot points are aligned with one another in a plane and provide a first geometrically locked position. In the second deployed position a second geometrically locked position is provided in which a link of the multi-link assembly (20) abuts another structure.

20 Claims, 7 Drawing Sheets

(56) References Cited

U.S. PATENT DOCUMENTS

| | | |
|---|---|---|
| 7,481,482 B2 | 1/2009 | Grave et al. |
| 7,878,582 B2 | 2/2011 | Fidan et al. |
| 8,177,288 B2 | 5/2012 | Molnar et al. |
| 8,944,491 B2 | 2/2015 | Neumann et al. |
| 9,102,367 B1 * | 8/2015 | Beierl .................... B62D 37/02 |
| 2007/0145776 A1 | 6/2007 | Grave et al. |
| 2008/0179914 A1 | 7/2008 | Wegener |
| 2015/0175223 A1 | 6/2015 | Jeong et al. |

OTHER PUBLICATIONS

International Preliminary Report on Patentability for International Application No. PCT/US2016/026011 dated Apr. 5, 2018.

* cited by examiner

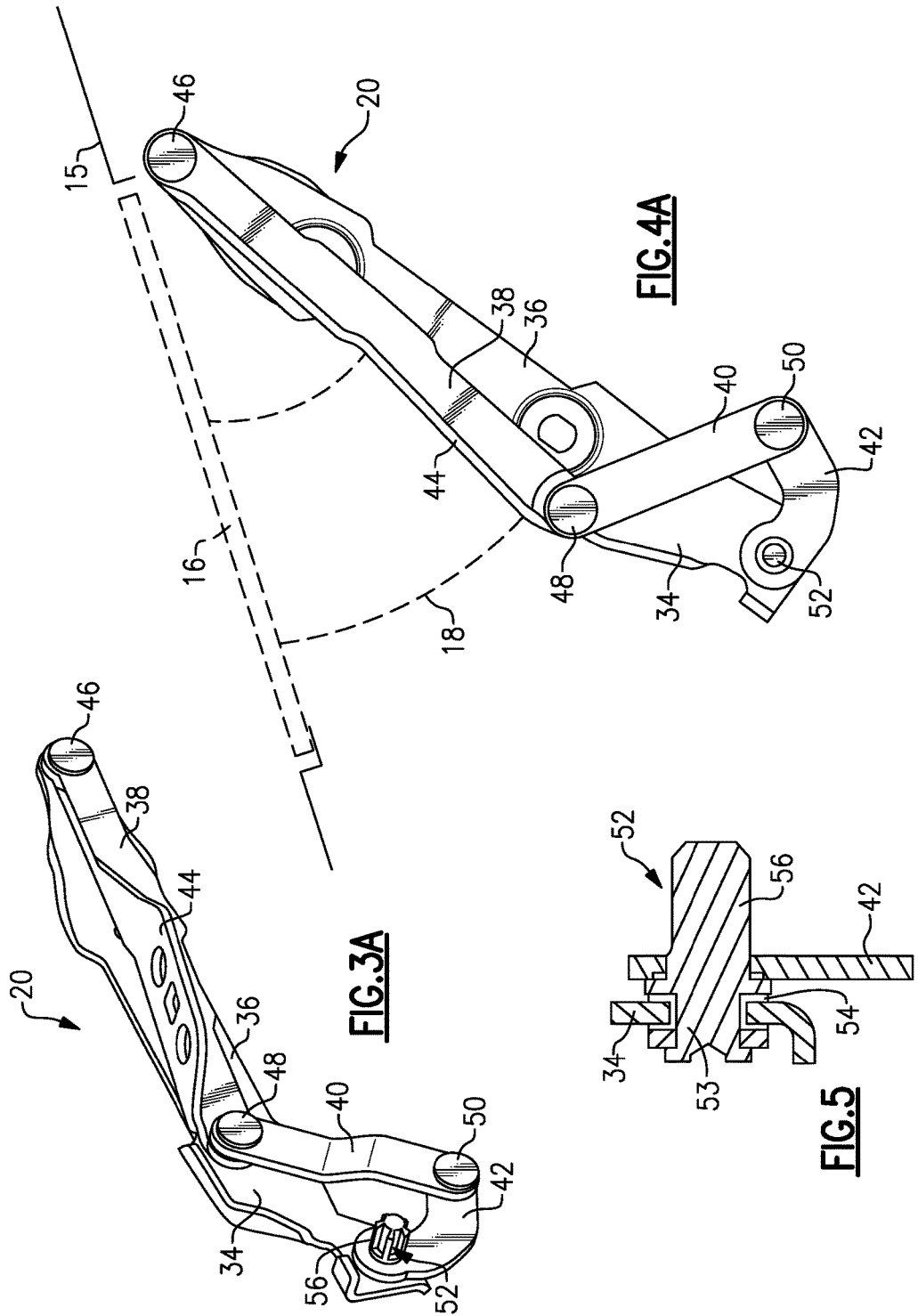

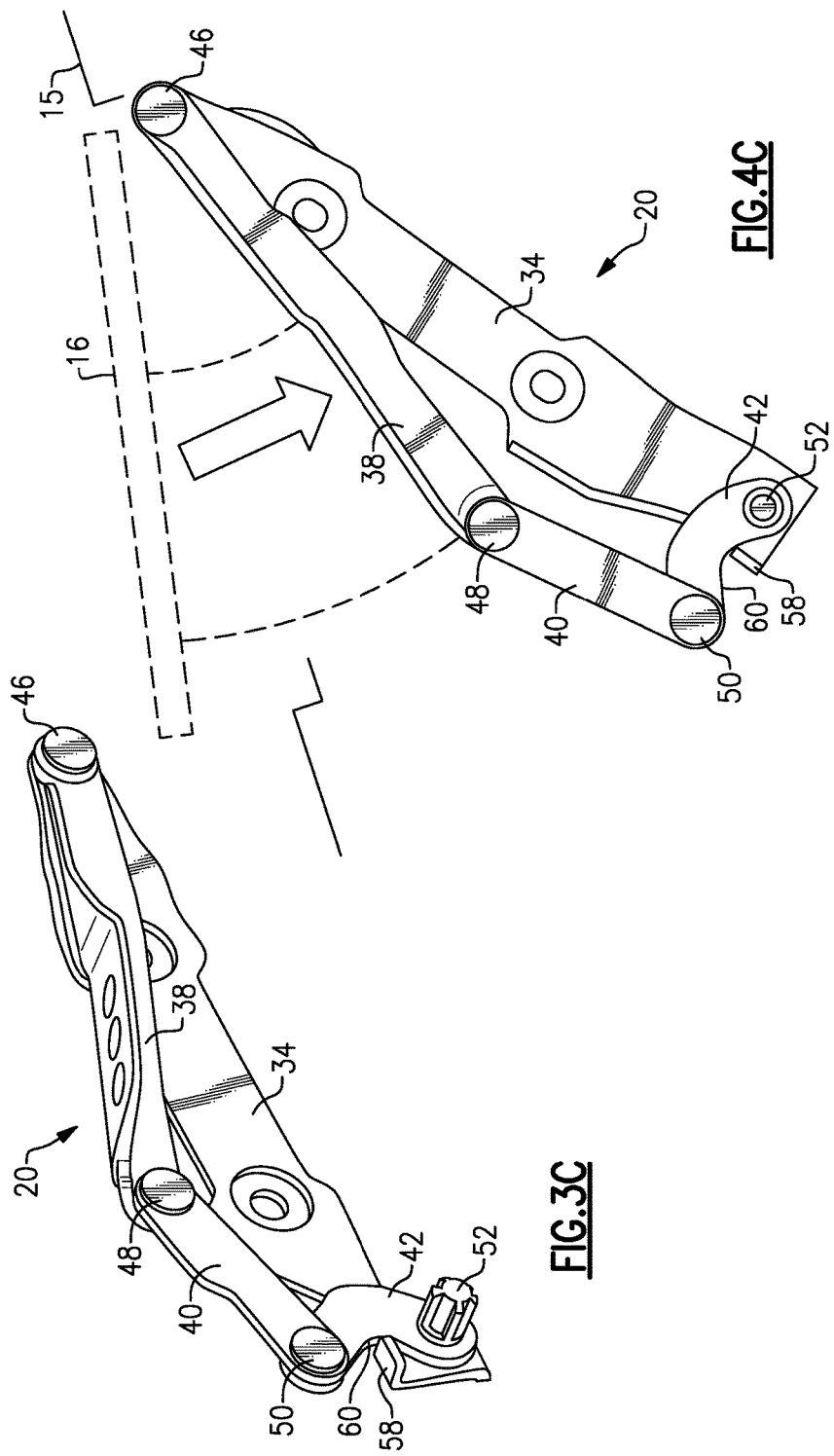

LOAD-RESISTANT SPOILER MECHANISM FOR VEHICLE

BACKGROUND

This disclosure relates to a spoiler mechanism for a vehicle. In one example, the spoiler mechanism provides a load-resistant rear spoiler in one or more deployed positions.

Deployable spoilers are commonly used in a vehicle to vary the aerodynamics of the vehicle during operation. One type of spoiler mechanism is a rear spoiler deployed from a stowed position in which the spoiler is even with an exterior body panel to at least two deployed positions and where the mechanism is kinematically stable and can resist a substantial vertical load imparted on the spoiler.

At least one actuator is used to deploy the spoiler. The spoiler mechanism is designed to withstand loads on an upper surface of the spoiler, such as aerodynamic loads and loads imparted on the spoiler from, for example, the weight of accumulated snow. Typically, these actuators must incorporate a brake or other feature in its gearbox that would prevent the load on the spoiler from back-driving the actuator and moving the spoiler to an undesired position.

SUMMARY

In one exemplary embodiment, a spoiler mechanism for a vehicle includes a spoiler that has a stowed position and first and second deployed positions. An actuator is configured to move the spoiler though the stowed and first and second deployed positions in response to a command. A closed loop multi-link assembly is interconnected by pivot points. The multi-link assembly is operatively connected to a spoiler. The first deployed position is provided in which at least three pivot points are in a plane and provide a first geometrically locked position. The second deployed position is arranged in a second geometrically locked position in which a link of the multi-link assembly abuts another structure.

In a further embodiment of the above, a mounting bracket is configured to be secured to a vehicle. The multi-link assembly is pivotally secured to opposing end portions of the mounting bracket.

In a further embodiment of any of the above, the multi-link assembly consists of three links.

In a further embodiment of any of the above, the first link includes a mounting flange to which the spoiler is secured.

In a further embodiment of any of the above, the first link is longer than the second and third links. The second link is longer than the third link.

In a further embodiment of any of the above, the first link has one end secured to the mounting bracket at a first pivot point. The second link is secured to an opposite end of the first link at a second pivot point. The third link is secured to the second link opposite the first link at a third pivot point. The third link is secured to the mounting bracket at a fourth pivot point opposite the second link. The second, third and fourth pivot points are arranged in the plane in the first deployed position.

In a further embodiment of any of the above, the actuator is connected to a drive lug at the fourth pivotal connection.

In a further embodiment of any of the above, a pair of multi-link assemblies are spaced apart from one another and support the spoiler. The actuator is a rotary actuator. A shaft is interconnected to each of the pair of multi-link assemblies and the rotary actuator.

In a further embodiment of any of the above, the third link abuts a stop provided on the mounting bracket in the second deployed position.

In a further embodiment of any of the above, the first deployed position is extended farther than the second deployed position.

In a further embodiment of any of the above, the spoiler is configured to pass through the first deployed position from the stowed position on the way to the second deployed position.

In a further embodiment of any of the above, the spoiler is flush with a surrounding body panel in the stowed position.

In a further embodiment of any of the above, the third link is arcuate in shape.

In another exemplary embodiment, a method of deploying a spoiler mechanism that includes a multi-link assembly interconnected by pivot points. The multi-link assembly is operatively connected to a spoiler. The method comprising the steps of deploying the spoiler to a first deployed position in which at least three pivot points are in a plane and deploying the spoiler to a second deployed position in which one of the links in the multi-link assembly abuts a stop.

In a further embodiment of any of the above, the first deployed position is extended farther than the second deployed position.

In a further embodiment of any of the above, the method includes a mounting bracket. The multi-link assembly includes first, second and third links. The first link has one end secured to the mounting bracket at a first pivot point. The second link is secured to an opposite end of the first link at a second pivot point. The third link is secured to the second link opposite the first link at a third pivot point. The third link secured to the mounting bracket at a fourth pivot point opposite the second link. The second, third and fourth pivot points are arranged in the plane in the first deployed position.

In a further embodiment of any of the above, the mounting bracket provides the stop. The third link abuts the stop in the second deployed position.

In a further embodiment of any of the above, the spoiler deploying steps are performed in response to rotation of a drive lug at the fourth pivot point.

In a further embodiment of any of the above, the drive lug is rotated in response to a command from an input to a rotary actuator.

In a further embodiment of any of the above, to the spoiler deploying step to the first deployed position occurs between the spoiler deploying step from a spoiler stowed position to the spoiler deploying step to the second deployed position.

BRIEF DESCRIPTION OF THE DRAWINGS

The disclosure can be further understood by reference to the following detailed description when considered in connection with the accompanying drawings wherein:

FIGS. 3A and 4A are respectively perspective and side views of the spoiler mechanism in the stowed position.

FIGS. 3C and 4C are respectively perspective and side views of the spoiler mechanism in the second deployed position.

FIG. 5 is a cross-sectional view through one pivot point having a drive lug.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
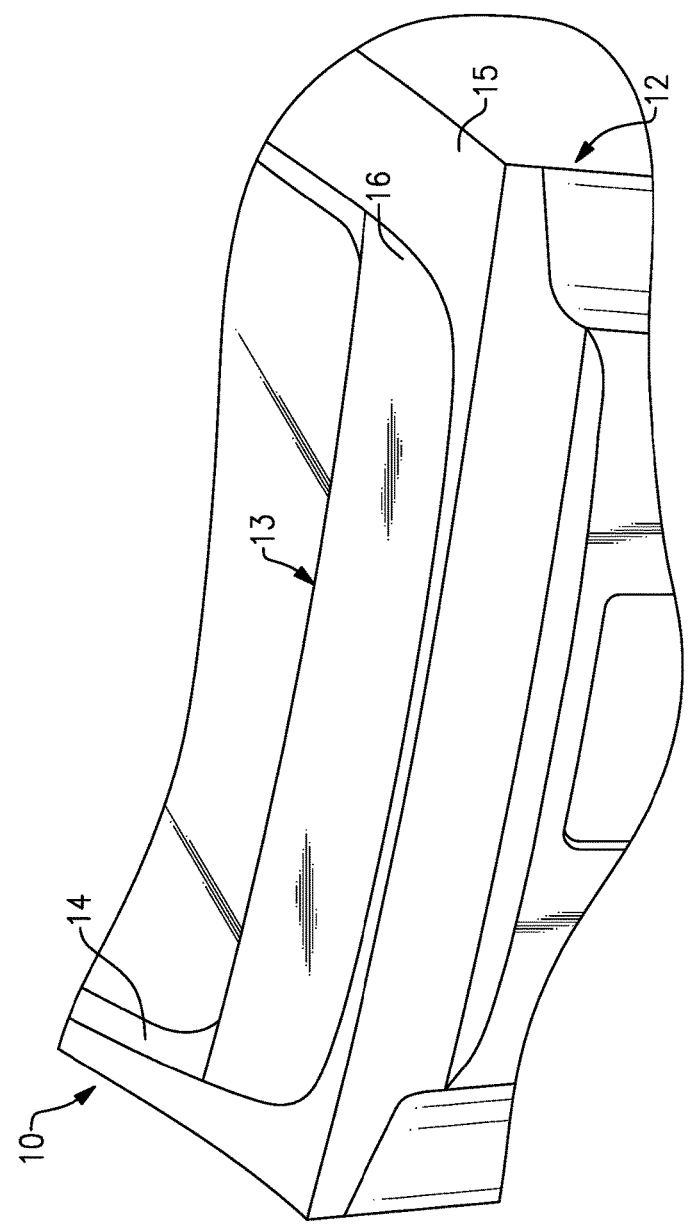
FIG. 1A is a partial perspective view of a spoiler in a stowed position.
Figure 1B:
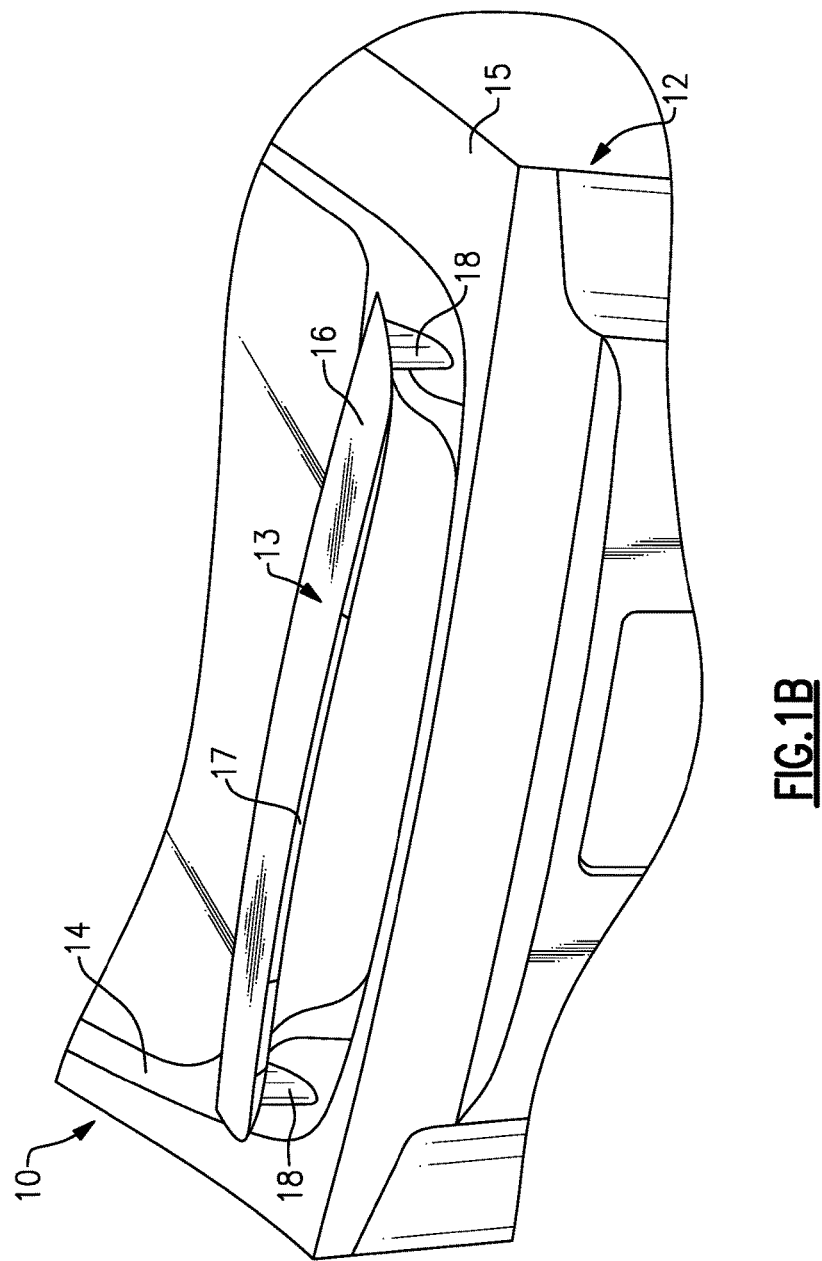
FIG. 1B is partial perspective view of the spoiler in a first deployed position.
Figure 1C:
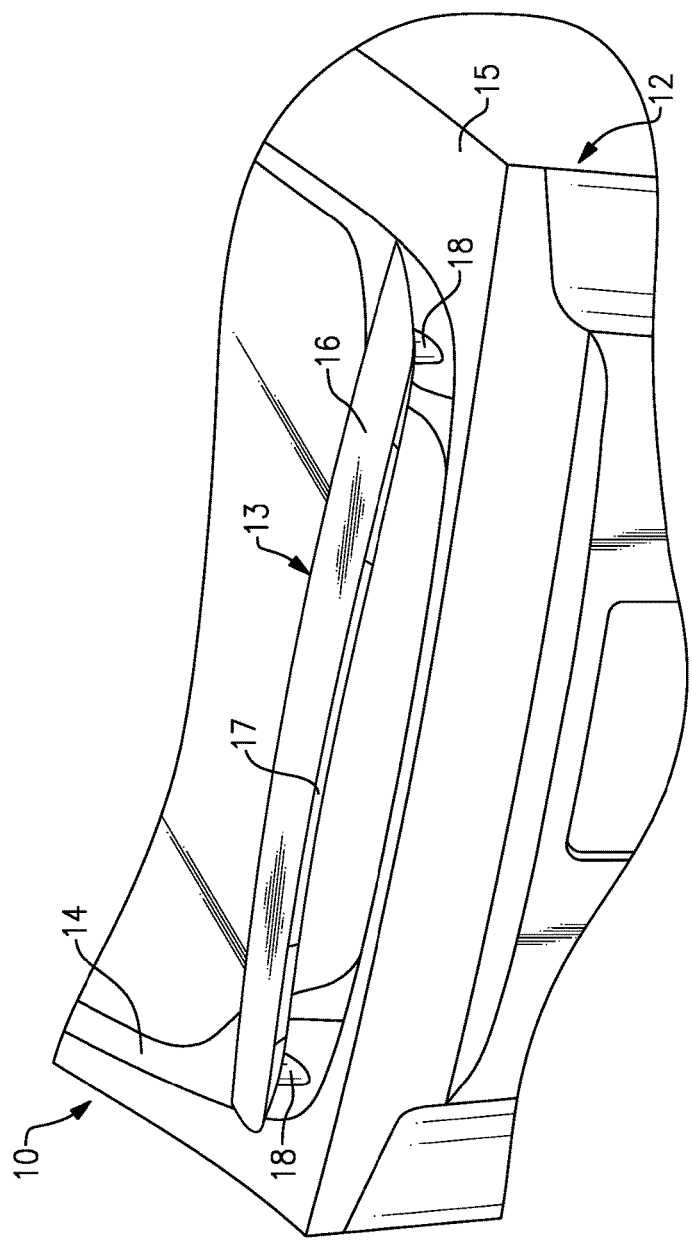
FIG. 1C is a partial perspective view of the spoiler in a second deployed position.

A rear 12 of a vehicle 10 is schematically shown in FIGS. 1A-1C. The rear 12 has a rear window aperture 14 provided by an exterior body panel 15. A spoiler or rear wing 16 is arranged at the rear 12. The spoiler 16 is shown in a stowed position in FIG. 1A. A spoiler mechanism 13 that includes the spoiler 16 is actuated from the stowed position to a first deployed position (FIG. 1B) and a second deployed position (FIG. 1C).

In the example, the spoiler 16 includes a center high-mount stop light (CHMSL) 17. The first deployed position is higher than the second deployed position and used at low speeds to provide the driver with improved visibility through the rear window aperture 14 beneath the spoiler 16. At a predetermined speed, the spoiler 16 is lowered from the first deployed position to the second deployed position for improved aerodynamic effect.

Figure 2:
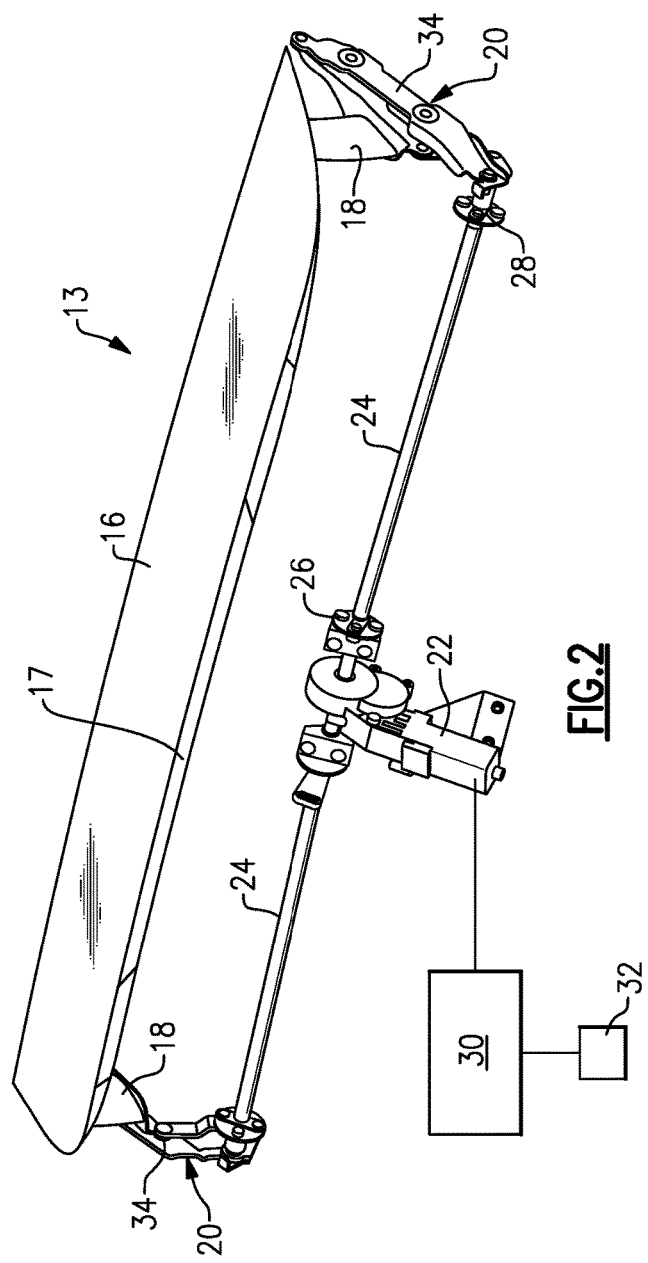
FIG. 2 is a perspective view of an example spoiler mechanism that includes a pair of multi-link assemblies.

One example spoiler mechanism 13 is shown in more detail in FIG. 2. The spoiler 16 is supported on spaced apart closed loop multi-link assemblies 20 by struts 18. The multi-link assembly 20 is driven by a rotary actuator 22 via shafts 24 interconnected between the rotary actuator 22 and the multi-link assemblies 20 at first and second connections 26, 28. It should be understood that other actuating configurations may be used if desired.

A controller 30 is in communication with the rotary actuator 22 and provides a command thereto based upon an input 32 to move the spoiler 16 between the stowed and first and second deployed positions. The input 32 may be provided by a switch and/or control logic based upon a speed of the vehicle that is used to automatically deploy the spoiler 16 to achieve a desired aerodynamic effect.

The left multi-link assembly 20 is shown in the stowed position in FIGS. 3A and 4A. A mounting bracket 34 is secured to vehicle support structure (not shown) at a face 36. The multi-link assembly 20 includes at least three links, for example, first, second and third links 38, 40, 42. In the illustrated embodiment, the first, second and third links 38, 40, 42 are connected serially to one another at pivotal connections with ends of the first and last links pivotally connected to opposing end portions of the mounting bracket 34. This arrangement provides a geometric arrangement of links in an interconnected "loop" without any links interconnected or bridging across the loop of links. The first link 38 is longer than the second and third links 40, 42, and the second link 40 is longer than the third link 42 in the example embodiment. Different length second and third links 40, 42 may be used in other applications. The first link 38 includes a mounting flange 44 to which the strut 18 is secured.

The first link 38 is pivotally secured to a forward end of the mounting bracket 34 at a first pivot point 46, which has a fixed position with respect to the vehicle 10. The second link 40 is pivotally secured to the first link 38 opposite the mounting bracket 34 at a second pivot point 48, which is permitted to move with respect to the vehicle 10. The third link 42 is secured to the second link 40 at a third pivot point 50 opposite the second pivot point 48, and at the aft portion of the mounting bracket 34 at a fourth pivot point 52. The third pivot point 50 is permitted to move with respect to the vehicle 10, and the fourth pivot point 52 has a fixed position with respect to the vehicle 10.

As shown in FIG. 5, a pin 53 is affixed to the third link 42 via a press-fit or weld, for example. A drive lug 56 is pivotally supported by a bushing 54 that is affixed to the mounting bracket 34 to provide the fourth pivot point 52. The drive lug 56 includes a profile that interlocks with an end of the shaft 24 to provide the second connection 28. Rotation of the drive lug 56 moves the third link 42 in an arc.

Figure 4B:
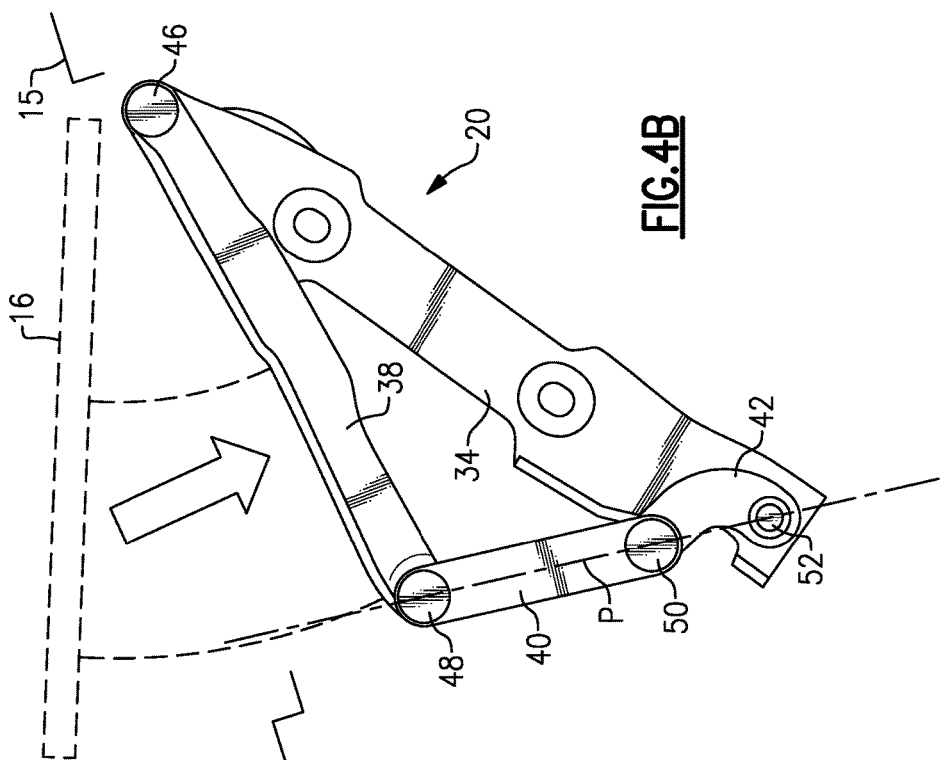
FIGS. 3B and 4B are respectively perspective and side views of the spoiler mechanism in the first deployed position.
Figure 3B:
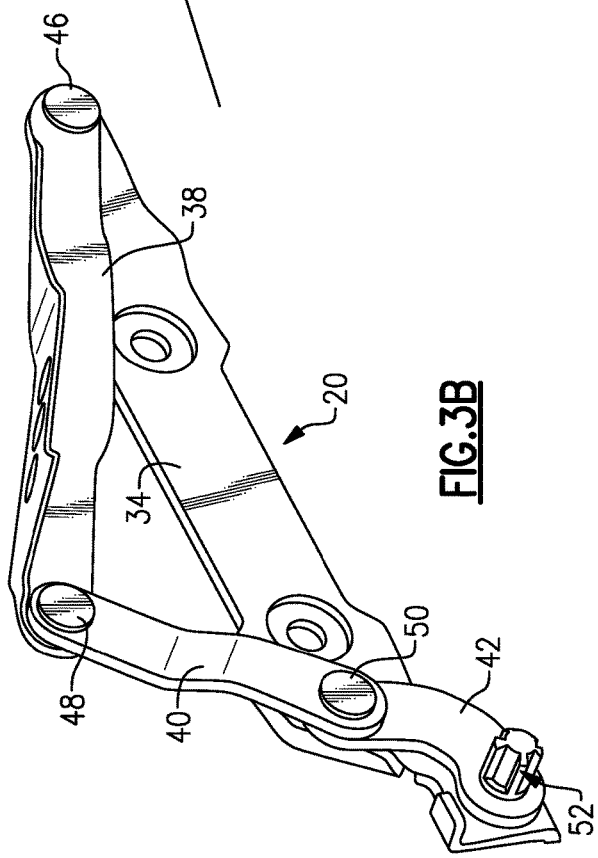

From the stowed position (FIGS. 3A and 4A), the third link 42 is rotated via the drive lug 56 at the fourth pivot point 52 to rotate the first and second links 38, 40 to the position illustrated in FIGS. 3B and 4B, which corresponds to the first deployed position. In this configuration, the second, third and fourth pivot points 48, 50, 52 are substantially aligned with one another in a plane P, for example, within 10°, providing a first geometrically locked position. In this arrangement, another link is not needed to "hold" the arrangement of links in the first geometrically locked position. As a result, the spoiler 16 may be loaded such that the force (indicated by hollow arrow) on the first link 38 cannot transmit a moment about first pivot point 46 which would impart undesired downward rotational movement of the second and third links 40, 42.

The actuator is configured to rotationally drive the third link 42 beyond its position when in the first deployed position (FIGS. 3B and 4B) to a second deployed position shown in FIGS. 3C and 4C. The spoiler 16 is moved closer to the vehicle exterior surface in the second deployed position than in the first deployed position. In the second deployed position, an inner arcuate surface 60 of the third link 42 engages a stop 58 provided by the bracket 34 providing a second geometrically locked position. Again, additional links are not needed to maintain this locked position. Due to the geometry of the multi-link assembly 20, any force (indicated by hollow arrow) on the spoiler 16 will generate a force on the third link 42 toward the stop 58, again preventing undesired rotation of the second and third links 40, 42 downward and beyond the position shown.

The disclosed configuration of the links and positioning of the pivotal connections in the desired deployed positions simplifies the spoiler mechanism, reducing weight and cost, by avoiding the need for more complicated actuator brakes or anti-back-driving devices.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A spoiler mechanism for a vehicle comprising:
a spoiler that has a stowed position and first and second deployed positions;
an actuator configured to move the spoiler through the stowed and first and second deployed positions in response to one or more commands; and
a multi-link assembly interconnected by a plurality of pivot points, the multi-link assembly operatively connected in a closed loop to the spoiler;
wherein, in the first deployed position, three pivot points are in a plane providing a first geometrically locked position, and in the second deployed position, the multi-link assembly is arranged in a second geometrically locked position.

2. A spoiler mechanism for a vehicle comprising:
a spoiler that has a stowed position and first and second deployed positions;
an actuator configured to move the spoiler through the stowed and first and second deployed positions in response to one or more commands;
a multi-link assembly interconnected by pivot points, the multi-link assembly operatively connected to the spoiler, wherein the first deployed position is provided in which three pivot points are in a plane providing a first geometrically locked position, and the second deployed position is arranged in a second geometrically locked position in which a link of the multi-link assembly abuts another structure which is in a fixed relationship to the vehicle;
a mounting bracket configured to be secured to the vehicle, wherein the multi-link assembly is pivotally secured at each of its ends to spaced apart portions of the mounting bracket.

3. The spoiler mechanism according to claim 2, wherein the multi-link assembly consists of first, second and third links.

4. The spoiler mechanism according to claim 3, wherein the first link includes a mounting flange to which the spoiler is secured.

5. The spoiler mechanism according to claim 3, wherein the first link is longer than the second and third links, and the second link is longer than the third link.

6. The spoiler mechanism according to claim 5, wherein the first link has one end secured to the mounting bracket at a first pivot point, the second link is secured to an opposite end of the first link at a second pivot point, the third link is secured to the second link opposite the first link at a third pivot point, and the third link is secured to the mounting bracket at a fourth pivot point opposite the second link, wherein the second, third and fourth pivot points are arranged in the plane in the first deployed position.

7. The spoiler mechanism according to claim 6, wherein the actuator is connected to a drive lug at the fourth pivot point.

8. The spoiler mechanism according to claim 7, comprising a pair of multi-link assemblies spaced apart from one another and supporting the spoiler, wherein the actuator is a rotary actuator, and a shaft is interconnected to each of the pair of multi-link assemblies and the rotary actuator.

9. The spoiler mechanism according to claim 3, wherein the third link abuts a stop provided on the mounting bracket in the second deployed position.

10. The spoiler mechanism according to claim 9, wherein the spoiler in the first deployed position extends farther from the stowed position than it does in the second deployed position.

11. The spoiler mechanism according to claim 10, wherein the spoiler is configured to pass through the first deployed position from the stowed position on the way to the second deployed position.

12. The spoiler mechanism according to claim 11, wherein the spoiler is flush with a surrounding body panel of the vehicle in the stowed position.

13. The spoiler mechanism according to claim 9, wherein the third link is arcuate in shape.

14. A method of deploying a spoiler mechanism that includes a multi-link assembly interconnected by a plurality of pivot points, the multi-link assembly operatively connected in a closed loop to a spoiler, the method comprising the steps of:
deploying the spoiler from a stowed position to a first deployed position in which three pivot points are in a plane; and
deploying the spoiler to a second deployed position in which one of the links in the multi- link assembly abuts a stop.

15. The method according to claim 14, wherein the spoiler in the first deployed position extends farther from the stowed position than in the second deployed position.

16. A method of deploying a spoiler mechanism that includes a multi-link assembly interconnected by a plurality of pivot points, the multi-link assembly operatively connected via a mounting bracket to a spoiler, the method comprising the steps of:
deploying the spoiler to a first deployed position in which three pivot points are in a plane; and
deploying the spoiler to a second deployed position in which one of the links in the multi- link assembly abuts a stop;
wherein the multi-link assembly includes first, second and third links, the first link has one end secured to the mounting bracket at a first pivot point, the second link is secured to an opposite end of the first link at a second pivot point, the third link is secured to the second link opposite the first link at a third pivot point, and the third link is secured to the mounting bracket at a fourth pivot point opposite the second link, wherein the second, third and fourth pivot points are arranged in the plane in the first deployed position.

17. The method according to claim 16, wherein the mounting bracket provides the stop, the third link abutting the stop in the second deployed position.

18. The method according to claim 16, wherein the spoiler deploying steps are performed in response to rotation of a drive lug at the fourth pivot point.

19. The method according to claim 18, wherein the drive lug is rotated in response to a command from an input to a rotary actuator.

20. A method of deploying a spoiler mechanism that includes a multi-link assembly interconnected by a plurality of pivot points, the multi-link assembly operatively connected to a spoiler, the method comprising the steps of:
deploying the spoiler to a first deployed position in which three pivot points are in a plane; and
deploying the spoiler to a second deployed position in which one of the links in the multi- link assembly abuts a stop, wherein the step of deploying the spoiler to the first deployed position occurs between the step of deploying the spoiler from the stowed position and the step of deploying the spoiler to the second deployed position.

* * * * *